US011269957B2

(12) United States Patent
Karmelich et al.

(10) Patent No.: US 11,269,957 B2
(45) Date of Patent: Mar. 8, 2022

(54) METHOD FOR CREATING A DATA INPUT FILE FOR INCREASING THE EFFICIENCY OF THE AVIATION ENVIRONMENTAL DESIGN TOOL (AEDT)

(71) Applicant: TETRA TECH, INC., Pasadena, CA (US)

(72) Inventors: Mark Karmelich, Rancho Palos Verdes, CA (US); Paul Dunholter, Corona del Mar, CA (US); Paul Ziegler, Georgetown, TX (US)

(73) Assignee: TETRA TECH, INC., Pasadena, CA (US)

( * ) Notice: Subject to any disclaimer, the term of this patent is extended or adjusted under 35 U.S.C. 154(b) by 379 days.

(21) Appl. No.: 16/367,336

(22) Filed: Mar. 28, 2019

(65) Prior Publication Data
US 2020/0311149 A1    Oct. 1, 2020

(51) Int. Cl.
*G06F 16/903* (2019.01)
*G08G 5/00* (2006.01)
*G06F 16/14* (2019.01)
*G06F 16/10* (2019.01)

(52) U.S. Cl.
CPC ........ *G06F 16/90335* (2019.01); *G06F 16/10* (2019.01); *G06F 16/156* (2019.01); *G08G 5/003* (2013.01); *G08G 5/0082* (2013.01)

(58) Field of Classification Search
CPC ... G08G 5/0026; G08G 5/0043; G08G 5/0082
See application file for complete search history.

(56) References Cited

U.S. PATENT DOCUMENTS

| | | |
|---|---|---|
| 6,992,626 B2 | 1/2006 | Smith |
| 7,222,017 B2 | 5/2007 | Clark et al. |
| 7,576,695 B2 | 8/2009 | Smith et al. |
| RE41,396 E | 6/2010 | Clark et al. |
| 7,796,055 B2 | 9/2010 | Clark et al. |
| 7,813,845 B2 | 10/2010 | Doose et al. |
| 7,818,100 B2 | 10/2010 | Goodman et al. |
| 7,889,133 B2 | 2/2011 | Smith et al. |
| 7,908,077 B2 | 3/2011 | Smith et al. |
| 7,912,742 B2 | 3/2011 | Trautman |
| 8,005,842 B1 * | 8/2011 | Pasca .................. G06F 16/3334 707/741 |
| 8,386,167 B2 | 2/2013 | Clark et al. |
| 8,396,614 B1 | 3/2013 | Pschierer |

(Continued)

FOREIGN PATENT DOCUMENTS

| | | |
|---|---|---|
| EP | 1470392 | 12/2008 |
| WO | 2003071228 | 8/2003 |

OTHER PUBLICATIONS

Aviation Environmental Design Tool (AEDT), Version 2c, AEDT Standard Input File (ASIF) Reference Guide, U.S. Department of Transportation, Federal Aviation Administration, Sep. 2016, p. 1.*

*Primary Examiner* — Robert W Beausoliel, Jr.
*Assistant Examiner* — Nirav K Khakhar
(74) *Attorney, Agent, or Firm* — Robinson IP Law, PLLC

(57) ABSTRACT

A method of increasing the efficiency of the Aviation Environmental Design Tool (AEDT) by using a computer algorithm to generate an input file with far fewer flight tracks than would normally be required to obtain the same AEDT results using the same data pool.

11 Claims, 4 Drawing Sheets

(56) References Cited

U.S. PATENT DOCUMENTS

| | | |
|---|---|---|
| 8,401,775 B2 | 3/2013 | Rozovski |
| 8,442,707 B2 | 5/2013 | Ledesma et al. |
| 8,543,258 B2 | 9/2013 | Halvorson et al. |
| 8,600,651 B2 | 12/2013 | Clark et al. |
| 8,635,551 B1 | 1/2014 | Su |
| 8,655,506 B2 | 2/2014 | Gomez et al. |
| 8,682,580 B2 | 3/2014 | Clark et al. |
| 8,706,388 B2 | 4/2014 | Pschierer et al. |
| 8,725,320 B1 | 5/2014 | Pschierer |
| 8,774,984 B2 | 7/2014 | Halvorson et al. |
| 8,788,187 B2 | 7/2014 | Doose et al. |
| 8,797,278 B1 | 8/2014 | Lutz et al. |
| 8,818,576 B2 | 8/2014 | Maldonado et al. |
| 8,990,257 B2 | 3/2015 | Barton et al. |
| 9,099,012 B2 | 8/2015 | Testrake et al. |
| 9,159,240 B2 | 10/2015 | Cornell et al. |
| 9,208,457 B2 | 12/2015 | Agrawal et al. |
| 9,262,930 B2 | 2/2016 | De Prins |
| 9,310,204 B2 | 4/2016 | McGregor et al. |
| 9,378,197 B1 | 6/2016 | Ghanem |
| 9,396,663 B2 | 7/2016 | Zimmer et al. |
| 9,424,756 B2 | 8/2016 | Gaertner et al. |
| 9,483,052 B2 | 11/2016 | McGregor et al. |
| 9,501,937 B2 | 11/2016 | Bruce et al. |
| 9,507,053 B2 | 11/2016 | Navarro et al. |
| 9,520,066 B2 | 12/2016 | Spinelli et al. |
| 9,535,818 B2 | 1/2017 | Vasudevan et al. |
| 9,613,537 B2 | 4/2017 | Meserole, Jr. et al. |
| 9,727,825 B2 | 8/2017 | Cetinich et al. |
| 9,773,415 B2 | 9/2017 | Villar et al. |
| 9,799,225 B2 | 10/2017 | Lueck et al. |
| 2004/0104824 A1* | 6/2004 | Cole ............... G08G 5/0026 340/971 |
| 2006/0191326 A1 | 8/2006 | Smith et al. |
| 2007/0217288 A1* | 9/2007 | Barry ............... G08G 5/0082 367/136 |
| 2008/0036659 A1* | 2/2008 | Smith ............... G08G 5/0082 342/454 |
| 2010/0079342 A1 | 4/2010 | Smith et al. |
| 2013/0166557 A1* | 6/2013 | Fricke ............... G06F 16/3331 707/737 |
| 2014/0257760 A1 | 9/2014 | Nixon |
| 2015/0017609 A1 | 1/2015 | Leao et al. |
| 2016/0210868 A1 | 7/2016 | Donovan |
| 2016/0371989 A1 | 12/2016 | D'Alto et al. |
| 2016/0379500 A1 | 12/2016 | Garrido Lopez |
| 2017/0030734 A1 | 2/2017 | Shafaat et al. |
| 2017/0132940 A1 | 5/2017 | Lopez Leones et al. |
| 2018/0061245 A1 | 3/2018 | Adler et al. |
| 2019/0075152 A1 | 3/2019 | Broadhurst |
| 2020/0035109 A1* | 1/2020 | Ramachandra ....... G06F 16/909 |
| 2020/0201905 A1* | 6/2020 | Kaufman ............ G06F 16/9027 |
| 2020/0226780 A1* | 7/2020 | Holliday ............ G06K 9/6262 |

\* cited by examiner

METHOD FOR CREATING A DATA INPUT FILE FOR INCREASING THE EFFICIENCY OF THE AVIATION ENVIRONMENTAL DESIGN TOOL (AEDT)

FIELD

This disclosure relates to the field of noise pollution analysis and remediation. More particularly, this disclosure relates to determining noise contours caused by aircraft around airports.

BACKGROUND

Airports and Air Navigation Service Providers ("ANSPs", such as the US Federal Aviation Administration (FAA)) have a regular need to calculate the noise "contours" around airports. These contours define the specific noise impact around an airport, neighborhood by neighborhood, street by street. The annual average decibel level of impact at a given location is a critical piece of information needed by airports and ANSPs because government programs are in place to pay for noise mitigation measures depending on the decibel levels from aircraft noise pollution in a given location. Large financial decisions are made based upon correct calculation of this information.

The FAA has created a software program called the Aviation Environmental Design Tool (AEDT) to help calculate these noise contours based on an input of "flight track" data, which is information about what types of aircraft have departed and arrived at an airport and the precise path and altitudes of each track. More specifically, flight track data is information about a flight (such as the aircraft/engine type, whether it was a departure or an arrival, what runway it used) and then each of the points of that departure or arrival (where each point contains four components: time/latitude/longitude/altitude).

Typically, airports and ANSPs are required to generate an annual contour including noise contour data which is often represented as a series of polygons surrounding an airport indicating the average noise exposure level across the year for areas surrounding the airports. Different features and complexities exist in tailoring these contours, including the decibel ranges (e.g., 65 db, 70 db, 75 db), the type of decibel levels used (e.g., "A-weighted" decibels to approximate how the human ear reacts to noise), and adjustment for evening and night time hour noise as those have greater impact on residents. AEDT is not only used to generate the contours of noise based on existing operations at an airport, but also projected future contours based on predicted air traffic plans, or ad-hoc contours based on proposed ideas such as adding a runway or changing where aircraft will fly near an airport.

Consultants use AEDT to generate contours for airports and ANSPs, but AEDT is cumbersome and considerably slow to use. AEDT requires special expertise plus patience in waiting for the software to run. Nonetheless, AEDT is the de facto standard for accurate noise contour results. AEDT runs slower the more "flight tracks" are fed into it. For example, if an airport as 200,000 flight operations a year, and a user wishes to generate a contour representative of the use at that airport, the user would feed 200,000 flight tracks into the AEDT software and wait many hours or even days for the software to run and generate contours.

What is needed, therefore, is a method to reduce the wait time when using AEDT while at the same time, ensuring that the resulting noise contours are accurate.

SUMMARY

The above and other needs are met by a method to minimize the number of flight tracks that are input to AEDT with the AEDT result still being substantially the same as if all flight tracks were input to AEDT. For the example described above, the method would select a fraction (e.g., 10%) of the 200,000 flight tracks occurring during a year but the selection is made to ensure that the AEDT output is substantially the same as if all 200,000 flight tracks were input to AEDT. The method reduces data not merely via random sample, but by several key processes that allow the method to generate a sample that accurately represents the data. This is based on knowledge of AEDT built into the method that will ultimately provide a random sample that AEDT will consider equivalent to the full data set.

The method described herein includes the ability for a user to specify many parameters to assist in creating the most accurate reduced data set. This flexibility is necessary to account for differences at different airports, and differences in the types of aircraft that operate at each airport (and what times of day they fly). Times of day are important because the results that come out of AEDT are sensitive to aircraft flying at different times of day. Optimization combined with the ability to automate intelligent customization could save untold amounts of time and money.

In a preferred embodiment, a method of generating an input file in a computable readable format for use with the Aviation Environmental Design Tool (AEDT) to increase the efficiency of the AEDT includes the steps of: (a) running a software program on a computer wherein the software program is stored on a computer readable medium in communication with the computer and wherein the software program includes an algorithm for performing specific steps; (b) inputting user input data to the computer using a graphical user interface in communication with the computer, wherein the user input data comprises information in the form of values related to specific variables associated with flights at a specific airport; (c) determining a plurality of unique factors using the computer based on the user input data, wherein each unique factor comprises a unique combination of variables from the user input data; (d) accessing a database in communication with the computer wherein the database includes flight track data stored thereon, such flight track data including data related to flight tracks of aircraft arriving and departing at a specific airport for a specific period of time; (e) querying the database using the computer to determine how many aircraft arrivals or departures meet each unique factor combination of variables for each unique factor; (f) running the algorithm to perform the steps of: (1) calculating an exact number of flight tracks to query the database for each unique factor; and (2) determining weight values to assign to the flight tracks for each unique factor; (g) querying a random sample of flight tracks in the database for each unique factor based on the calculated exact number of flight tracks and the determined weight values; and (h) generating an input file comprising all flight track data associated with the random sample of flight tracks queried by the computer.

The method preferably further includes an initial step of collecting flight track data and storing such flight track data in a database in communication with the computer.

The step of inputting user input data may further include inputting user input data in the form of weight values for specific variables wherein more weight is given to queried data that meets specific criteria.

The step of accessing the database may further include detecting and adjusting anomalies in the flight track data.

The method may further include the step of determining an ideal number of flight tracks for selection based on the user input data including a variable of average daily flight operations multiplied by a variable of number of days for such flight operations.

The method may further include the steps of: querying the database to determine the total number of aircraft departures and arrivals by aircraft type for a specified time period; and creating a departure weight value based on the total number of aircraft departures and arrivals equaling total number of arrivals divided by the total number of departures during the specific time period; creating an arrival weight value based on the total number of aircraft departures and arrivals equaling total number of departures divided by the total number of arrivals during the specific time period; and adjusting a percentage of aircraft arrivals versus departures using the algorithm by factoring in the departure weight and the arrival weight.

In another aspect, embodiments of the disclosure provide a method of generating an input file in a computable readable format for use with the Aviation Environmental Design Tool (AEDT) to increase the efficiency of the AEDT, the method comprising the steps of: (a) receiving user input data on a computer, the user input data including values related to specific variables associated with flights at a specific airport; (b) determining a plurality of unique factors using the computer based on the user input data, wherein each unique factor comprises a unique combination of variables from the user input data; (c) accessing a database in communication with the computer wherein the database includes flight track data stored thereon, such flight track data including data related to flight tracks of aircraft arriving and departing at a specific airport for a specific period of time; (d) querying the database using the computer to determine how many aircraft arrivals or departures meet each unique factor combination of variables for each unique factor; (e) calculating an exact number of flight tracks to query the database for each unique factor; (f) determining weight values to assign to the flight tracks for each unique factor; and (g) generating a file comprising all flight track data associated with the random sample of flight tracks queried by the computer.

In another aspect, embodiments of the disclosure provide a method of processing an input file in a computable readable format for use with the Aviation Environmental Design Tool (AEDT), the method comprising the steps of: (a) running AEDT software on a first computer; and (b) processing an input file using the first computer running the AEDT software wherein the input file is in a computable readable format which is compatible with the AEDT software and wherein the input file was created using the steps of: (1) determining a plurality of unique factors using a second computer based on user input data, wherein each unique factor comprises a unique combination of variables from the user input data; (2) accessing a database in communication with the second computer wherein the database includes flight track data stored thereon, such flight track data including data related to flight tracks of aircraft arriving and departing at a specific airport for a specific period of time; (3) querying the database using the second computer to determine how many aircraft arrivals or departures meet each unique factor combination of variables for each unique factor; (4) calculating an exact number of flight tracks to query the database for each unique factor; and (5) determining weight values to assign to the flight tracks for each unique factor, wherein the input file comprises all flight track data associated with the random sample of flight tracks queried by the second computer.

In some embodiments, the first computer comprises the second computer.

The method preferably further includes a step of producing a noise contour file based on the processed input file wherein the noise contour file includes noise contour data that is substantially the same as noise contour data that would have been produced using the AEDT software if all flight tracks from the database had been included in the input file.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
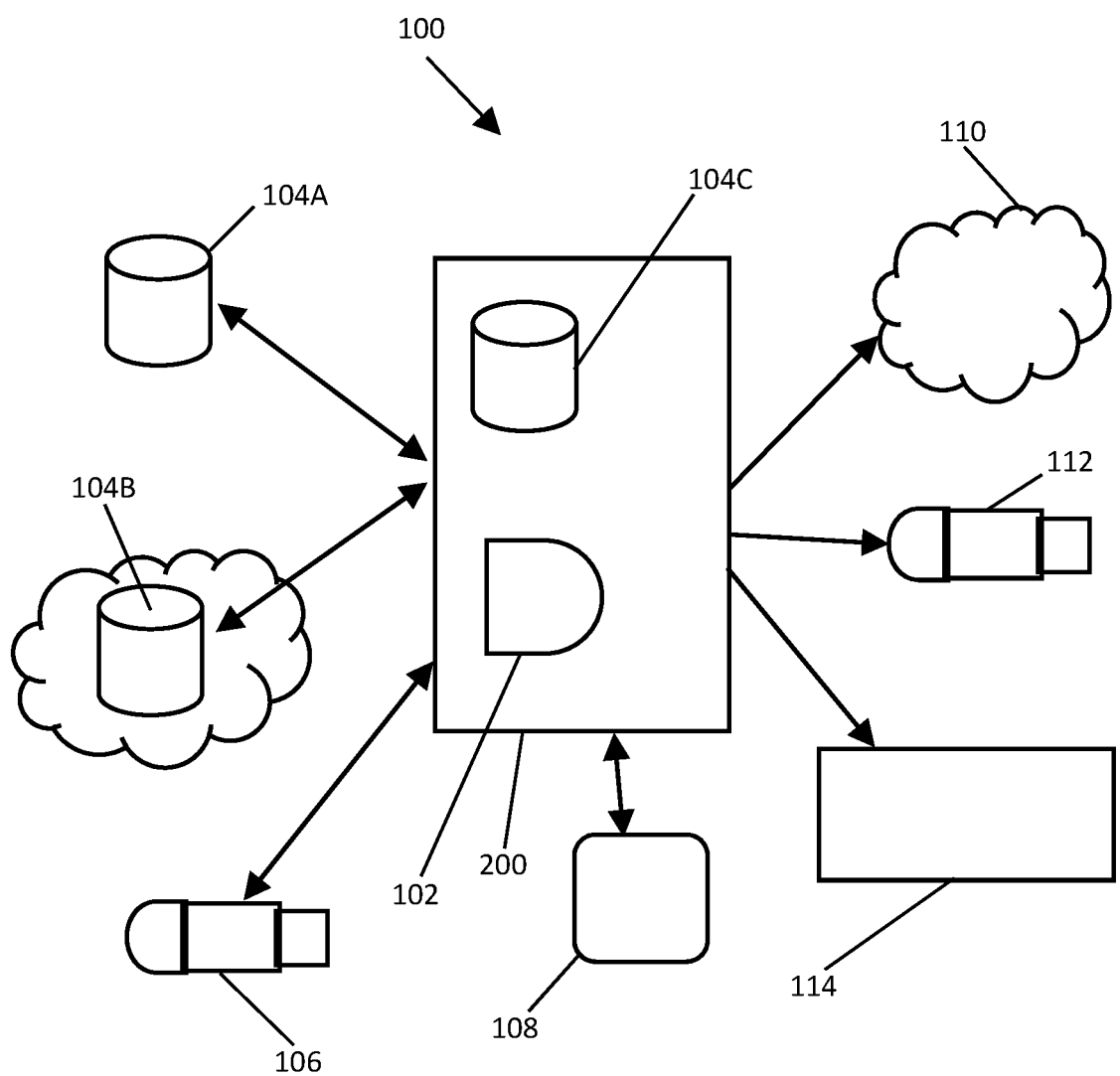
FIG. 1 shows a schematic of a system for accomplishing embodiments of the methods described herein.

FIG. 1 shows a basic embodiment of a system 100 for creating a data input file for increasing the efficiency of the Aviation Environmental Design Tool (AEDT). The system 100 includes a computer 200 which is shown in more detail in FIG. 2. The system 100 including the associated computer 200 follow method steps described herein and shown in FIG. 3 and FIG. 4 to prepare an input data file that can be fed to the AEDT to increase the efficiency of the AEDT by reducing the amount of data fed to a computer running AEDT software. However, the method is accomplished in such a way that the resultant reduced data set causes the AEDT to output substantially the same output data as if a full (non-reduced) data set had been input to the computer running the AEDT software. Because less data is input to the AEDT, it runs faster and, therefore, more efficiently. (When referring to "the AEDT", it should be understood that AEDT is a program stored on a computer readable medium and run on a computer.)

In order to obtain a reduced dataset that will cause the AEDT to output accurate results, a software program 102 stored on a computer readable medium in communication with or otherwise stored on the computer 200 is provided. In order to run the software program 102, flight track data must be gathered from one or more sources. Such data is then saved to one or more databases 104A on a local network in communication with the computer 200, one or more databases 104B on the cloud or generally on the Internet in communication with the computer 200, one or more databases 104C on the computer 200 itself, or a mobile data storage device 106 (e.g., a USB stick) (hereinafter, collectively, "the database 104"). Data can also be entered through a graphical user interface (GUI) 108 in communication with the computer 200. The gathered flight track data is usually in the form of radar data feeds that provide, for each flight track, the latitude, longitude, and altitude of every point in the flight track along with the exact time of that point. The gathered data also preferably contains information about the aircraft type that was flown for each track, whether the flight was an arrival or departure, and the origin/destination airport. After further method steps, a resultant reduced data set is created which can be stored on the computer 200 or sent to be stored on the cloud 110, a mobile storage device 112 (e.g., a USB stick), or another computer or database 114.

Figure 2:
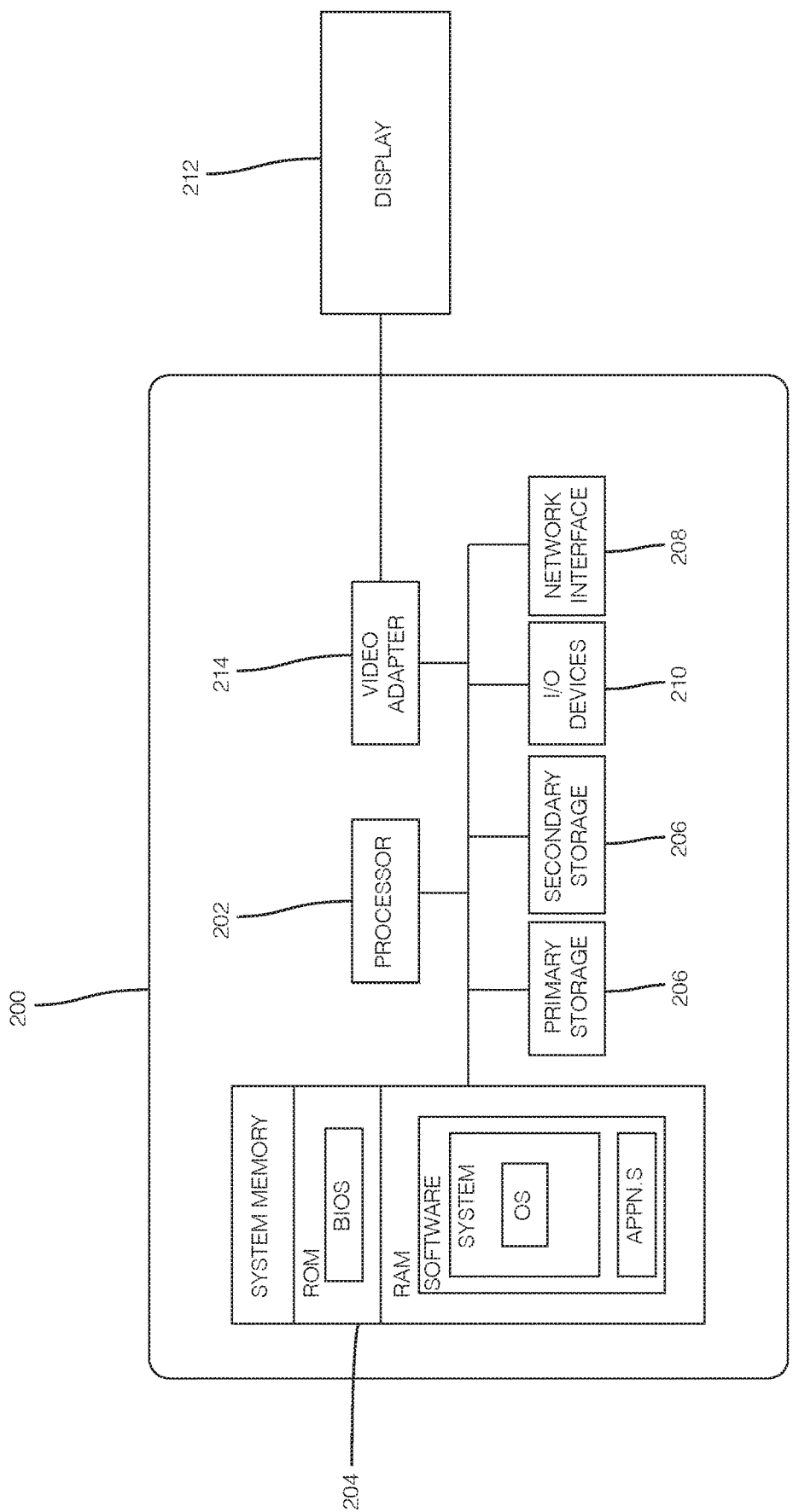
FIG. 2 shows a schematic of a computer system on which the present invention may be implemented.

FIG. 2 shows an example of the computer 200 that can be used to accomplish certain steps of various embodiments of the method described herein. The computer includes a central processing unit ("CPU") 202 and memory 204 in the form of computer-readable memory, such as random access memory ("RAM") and read-only memory ("ROM"). Program information or data is stored on the memory 204 and may include operating system code for the computer 200 and application code for applications operable on the computer 200. The computer 200 may further include primary and secondary storage 206, such as optical disk storage and/or magnetic disk storage. Program information and other data may also be stored on the secondary storage 206.

The computer 200 includes a network connection means 208 for communicating with a network, such as a local area network ("LAN") or the Internet. The computer 200 further preferably includes one or more input devices 210, such as a keyboard, mouse, scanner, touchscreen, voice input, and other various devices for receiving input on the computer 200. Input is received on the computer 200 through the one or more input devices 210, such as text, images, graphics, and other various inputs. The computer 200 further includes one or more output devices such as a display 212 for receiving output from a video adapter 214 of the computer 200. Other various output devices may include, for example, a printer, sound output, video output, and other various outputs.

Figure 3:
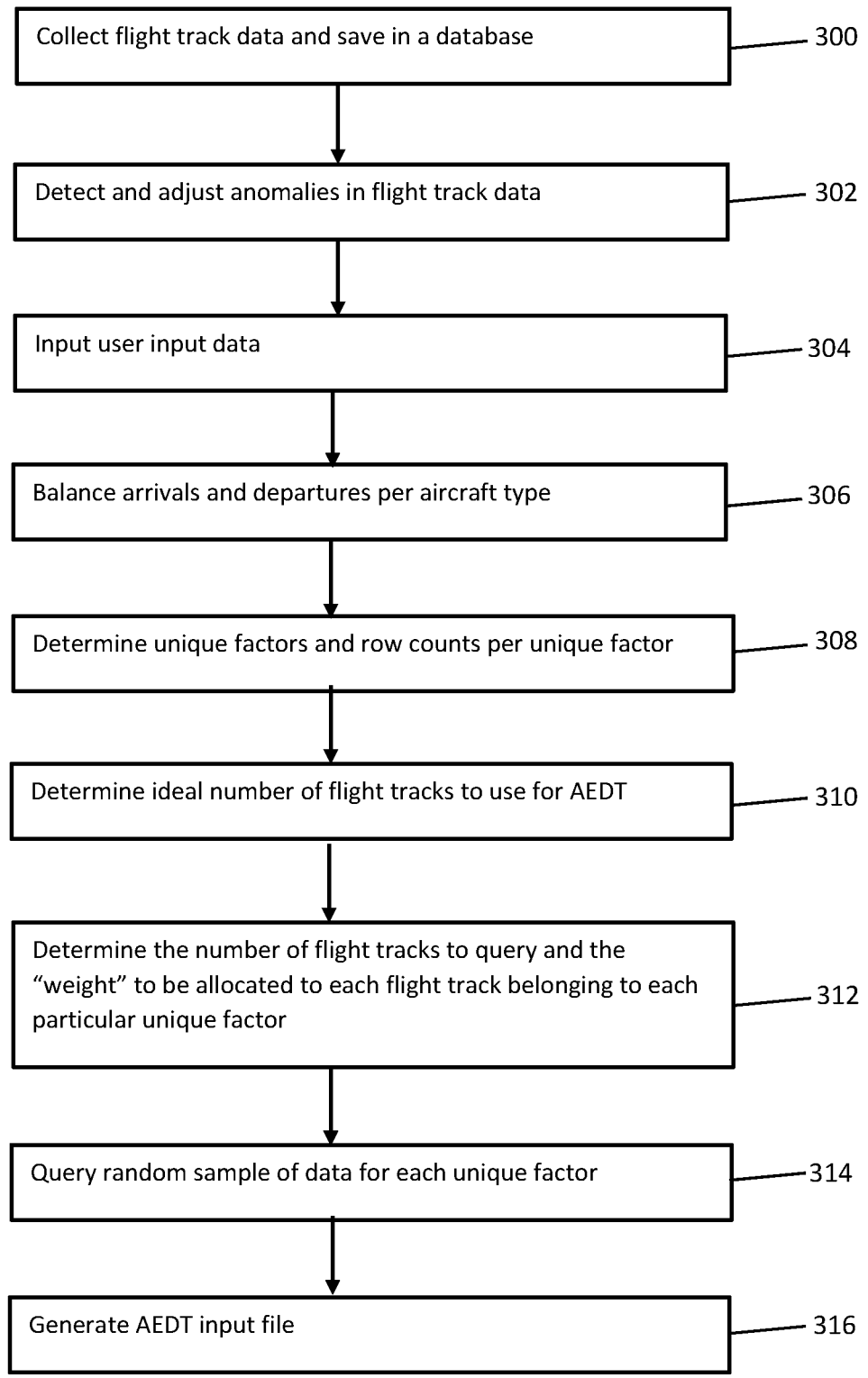
FIG. 3 shows a flow chart including method steps used for accomplishing embodiments of the method described herein.

With reference to FIG. 3, a first step 300 of a preferred embodiment of the method includes gathering flight track data. The flight track data is saved to the database 104. An optional second step 302 includes detecting and adjusting anomalies in the flight track data. This step 302 can be thought of as a step to "clean up" the flight track data by detecting clearly incorrect data points and smoothing out the data using a data smoothing algorithm such as, for example, a Smoothing Spline or Local Polynomial Regression. In addition, and most importantly for AEDT, the flight track data is sometimes incomplete in that the tracks do not fully reach a runway. In these cases, an additional track segment is preferably created to attach the particular flight to a runway. This can be accomplished manually through the graphical user interface 108 or automatically by the software program 102. In difficult cases (e.g., the track data is missing too many points and is too far from an airport), the particular flight track data featuring the anomaly is preferably ignored by the software program 102. For example, the program would consider a minimum distance from the airport for a track to be valid, and if it is the software would simply add a synthetic track point on the runway connecting it to the first point, with a time value calculated based on the computed speed of the flight. Each track sent to AEDT in the resultant reduced data set is "weighted". For example, if a particular flight track has a weight of "2", that means the resultant reduced data set sent to AEDT causes AEDT to pretend there are two tracks in the input that are identical to this single flight track. AEDT can process a single flight with a weight of "2" faster than it can process two identical tracks each with a weight of "1". However, in both cases, the resulting output data from AEDT will be the same. The goal is to reduce a number of flight tracks, setting weight values accordingly.

Another step 304 of a preferred embodiment of the method includes collecting user input data. This is accomplished using the graphical user interface 108. Table 1 provided below includes a first column of variables discussed in more detail herein, a second column of example values, and a third column providing some description of the particular variable.

TABLE 1

|  | Example Values | Description |
| --- | --- | --- |
| Required Variables | | |
| Name | JFK01 | Arbitrary name for this study |
| Database | JFKAirport | Database name, typically the airport |
| StartDate | Jan. 1, 2017 | First Date of data |
| EndDate | Dec. 31, 2017 | Last Date of data (typically a year after Start) |
| AvgDailyOps | 300 | How may flight operations (arrivals or departures) this airport typically has in a day |
| NumOfDays | 10 | Number of days to reduce data to. E.g., 36.5 days means approx 1/10th the data queried than a full 365 days |
| MinTracksPerFactor | 5 | Minimum number of tracks to query for each unique combination of factors, to make sure we have an accurate representation |

TABLE 1-continued

| | Example Values | Description |
|---|---|---|
| MaxTracksPerFactor | 300 | Maximum number of tracks to query for each unique combination of factors, so we don't waste time querying more than we need |
| DepArrEqual | Yes | Force departure and arrival counts to be equal for each unique aircraft type |
| Optional Variables | | |
| FactorArrDep | Yes | Factor based on Arrival/Departure |
| FactorAirport | No | Factor based on Airport |
| FactorRunway | Yes | Factor based on Runway name |
| FactorDEN | Yes | Factor based on DEN (Day/Evening/Night) |
| FactorAirlineClass | No | Factor based on Airline Class |
| FactorAircraftType | No | Factor based on Aircraft Type |
| FactorAircraftClass | No | Factor based on Aircraft Class |
| FactorAircraftClass2 | No | Factor based on Aircraft Class2 |
| FactorProcedure | No | Factor based on Procedure |
| FactorINMTrack | No | Factor based on INM Track |
| FactorINMType | Yes | Factor based on INM Type (Exact model of aircraft) |
| ExtraWeight1 | DEN, N , 2 | Given additional weight to flights that match this field and value. |
| ExtraWeight2 | AircraftClass2, J, 2 | Given additional weight to flights that match this field and value |
| . . . ExtraWeightN | | Given additional weight to flights that match this field and value |
| FilterArrDep | | Restrict to just data to just Arrivals or Departures |
| FilterAirport | JFK | Restrict to just this airport |
| FilterRunway | 4L, 4R, 13L, 13R | Restrict to one or more runways |
| FilterDEN | | Restrict to Day, Evening or Night |
| FilterAirlineClass | | Restrict to a particular Airline Class |
| FilterAircraftType | | Restrict to a particular Aircraft Type |
| FilterAircraftClass | | Restrict to a particular "Aircraft Class" |
| FilterAircraftClass2 | | Restrict to a particular "Aircraft Class2" |
| FilterProcedure | | Restrict to a particular flight procedure |
| FilterINMTrack | | Restrict to a particular INM Track association |
| FilterINMType | | Restrict to a particular INM Type (Exact model of aircraft) |

A user manually inputs the user input data to the computer 200. Of special note is the ExtraWeight1, Extra Weight2, . . . ExtraWeightN values (there can be as many ExtraWeight values as the user wishes to specify). This feature is important because it allows a user to place more emphasis or "weight" on a particular variable. For example, the ExtraWeight1 variable in Table 1 is set so that the subcategory of "N" (Night) from the category of "DEN" (Day-Evening-Night) is given a weighted value of "2" instead of 1. As such, more emphasis will be placed on flights that fit this category (i.e., flights that arrive or depart during the "N" (Night) period). Note that this added emphasis does not mean that the AEDT results will be skewed via consideration of more "N" (Night) flights than is proportionally represented in the flight track data, but instead it is used to ensure that enough of a statistical sample is gathered for this category so that there is a sufficient representational set of track points for this category.

Step 306 includes balancing the number of arrivals and departures per aircraft type. The variable "INM Type" represents the unique aircraft type and model. In theory, each INM Type should have the same number of arrivals and departures for the selected timeframe (e.g., a year) at a given airport. But the flight track data may be missing information, and such information needs to be balanced out if information is missing. This is accomplished by selecting (e.g., via SQL query to the database 104) the count of unique "Departure or Arrival" and INM Type combinations over a selected period of time (e.g., a year). The results of the search will provide two new variables per INM Type including "depWeight" and "arrWeight". "depWeight" is the departure weight and is set to "1" unless there are less departures than arrivals for this INM Type, in which case it is set to #arrivals/#departures for this INM Type. "arrWeight" is the arrival weight and is set to "1" unless there are less arrivals than departures for this INM Type, in which case it is set to #departures/#arrivals for this INM Type. For example, if for a given INM Type, there are 10 departures and 7 arrivals, then depWeight will be "1" and arrival weight will be 10/7=1.42857. The depWeight and arrWeight values are used later in further calculations.

Step 308 includes determining unique factors and row counts per unique factor. A key to reducing the amount of data sent to the AEDT is to query "counts" of information across the entire selected time period (e.g., a year) for "unique factors" of information, the results of which are used to generate more specific queries returning a reduced amount of data.

A "unique factor" is a set of values for a specific combination of variables specified in the user input (Step 304). For example, if a user specified three variables including "ArrDep" (Arrival, Departure), "Runway", and "DEN" (aka Day, Evening or Night), there would necessarily be a minimum number of unique factors. Every flight must be an arrival or departure (2 values), must use a runway, and must depart or arrive in the day, evening or night (3 values). If there are two runways (2 values) at the specified airport (01 and 19), in this scenario, there would be 12 unique factors. All 12 combinations are shown in Table 2 below.

TABLE 2

Arrival, Runway 01, Day
Arrival, Runway 01, Evening
Arrival, Runway 01, Night
Arrival, Runway 19, Day
Arrival, Runway 19, Evening
Arrival, Runway 19, Night
Departure, Runway 01, Day
Departure, Runway 01, Evening
Departure, Runway 01, Night
Departure, Runway 19, Day
Departure, Runway 19, Evening
Departure, Runway 19, Night There may be far more than 12 unique factors, and a number of unique factors may depend on how many variables are chosen by the user in the user interface. In fact, INM Type (or INM_TYPE) must be added as a factor so that all the different aircraft types passing through an airport can be considered. When INM_TYPE is added to the above example, then the number of unique factors would be equal to 12 times the number of unique aircraft models that flew at this airport during the specified time period.

All the unique factors and the row counts (i.e., how many flight operations there were in the time period) for that unique factor set can be determined by performing an SQL Query on the database 104. A sample query might look like the following, for the above example factors+INM Type for the year 2017:

SELECT RUNWAY, DEN, INMTYPE_ID, COUNT(*) as CNT FROM FLIGHT_DATA
WHERE datetime_da BETWEEN '2017-01-01 00:00:00' AND '2017-12-31 23:59:59'
AND RUNWAY IN ('01, '19')
GROUP BY RUNWAY,DEN,INMTYPE_ID
ORDER BY RUNWAY,DEN,INMTYPE_ID The result of this query will provide a count of flight operations throughout the year for each unique set of factors that have been selected. This will serve as the basis for how to query a much smaller amount of data but keep similar proportions to what occurred throughout the year. Note that in this query the value of two new variables that will be used below in further steps can be determined. Those new variables include the following:

InmTypeTotDep=Total # of departures for this INM Type
InmTypeTotArr=Total # of arrivals for this INM Type
TotalNumTracks=total number of flight tracks for the year for this airport "FLIGHT_DATA" is broadly defined as a table of all flight tracks stored on the database 104, such data having different columns for different characteristics of the data (e.g., aircraft type, arrival/departure, Day-Evening-Night (DEN)).

A next step 310 includes determining the ideal number of flight tracks ("IdealNumTracks") to use with the AEDT In other words, this step is to identify how many tracks are to be queried under ideal circumstances to arrive at substantially the same output using the AEDT as if all flight tracks had been put into the AEDT This is accomplished based on input given in Step 304, namely "AvgDailyOps", i.e., the number of operations (departures+arrivals) the particular airport has in a typical day, and "NumOfDays", i.e., the ideal number of days for the calculation to be minimized to. This will provide an ideal number of flight tracks to be created. This calculation is made using Equation 1 below:

$$IdealNumTracks = AvgDailyOps * NumOfDays \quad \text{Equation 1}$$

For example, if it is known that an airport has 2,000 operations per day, and a goal is to use 5 days' worth of data, then about 10,000 flight tracks should be sent to the AEDT If the specified airport has 100,000 operations per year, then about 10% of the flight tracks from the database 104 need to be queried. Note that in this example the use of "approximately" 10,000 tracks—it can be plus or minus some flight tracks to account for certain factors and make sure the data is representational of all 100,000 flight tracks.

Step 312 includes determining the number of flight tracks to query and the "weight" to be allocated to each track belonging to each particular unique factor. Step 312 takes all the information obtained or calculated in prior steps to determine two variables per unique factor as follows:

ExactNumTracks: the number of flight tracks to query for this unique factor
WeightFinal: the weight value to be sent to AEDT for each track belonging to this unique factor For example, a unique factor might be as follows: Runway 01, Evening, Arrival, INM Type 32

In this example, through the course of the year, there were 500 flights matching that unique factor. Based on previous calculations, the goal is to query a 10% random sample of the data, so ExactNumTracks might be 50, and the WeightFinal would be 0.1, meaning these 50 tracks represents 0.1 times the 500 tracks available for the year for this unique factor. In reality, however the process is not so simple because of the complex nature of getting the most exact representation and weighting, based not only on the data but on a user's desire to give extra weight to certain variables. This complexity is represented in the steps shown in FIG. 4 which are discussed in more detail below regarding Step 312.

Step 314 includes querying a random sample of data on the database 104 for each unique factor. For each unique factor, calculations have been made to determine the ExactNumTracks to query and the WeightFinal value to use for the AEDT At this point, a random sample of data must be queried that meets each unique factor criteria, such that the random sample returns ExactNumTracks rows. To do this most efficiently, the first query includes the following:

SELECT OPER_ID from FLIGHT_DATA where . . . (data meets a specific unique factor and date range)

OPER_ID is a unique number for every flight track in a data table of flight track data generated by the query listed above. This list of OPER_IDs is stored in memory 204 in the code's variables and then, using the software program 102 in conjunction with the computer 200, OPER_IDs are randomly selected from the list until the computer 200 has ExactNumTracks of the OPER_IDs stored in memory 204 in the code's variables. For example, if the particular unique factor being queried has 500 tracks during the applicable year, the SELECT statement above will return 500 OPER_ID values. But if ExactNumTracks is 50, then the software program 102 on the computer 200 randomly selects 50 of those OPER_IDs. Once the set of 50 random OPER_IDs are stored, a query is conducted on the database 104 for ALL columns in the FLIGHT_DATA table for just those OPER_IDs, thus providing all the flight track data required for that specific unique factor. Each row of data returned is assigned a "weight", found in a column called WEIGHT which is the WeightFinal value for this unique factor. The selected flight track data and WeightFinal values are stored in memory 204 in the code's variables. Step 314 is preferably repeated for every unique factor.

A final step 316 involves creating an AEDT input file—the file that is substantially smaller than the file of all flight tracks that would otherwise have been used but for the software program 102. At this point, there are rows of flight track data and associated WEIGHT values that have been stored. The flight track data is translated into the format required by AEDT which is generally an XML file format with specific tags, such format known to persons having ordinary skill in the art. The formatted file includes the random sample of flight track data, with each flight track containing a unique WEIGHT value to represent how many times each particular track should be counted by the AEDT. WEIGHT values need not be whole numbers. The system 100 can calculate a WEIGHT value of, for example, 5.573, meaning that that particular flight track should be considered to have occurred 5.573 times during the selected time period (typically a year).

Figure 4:
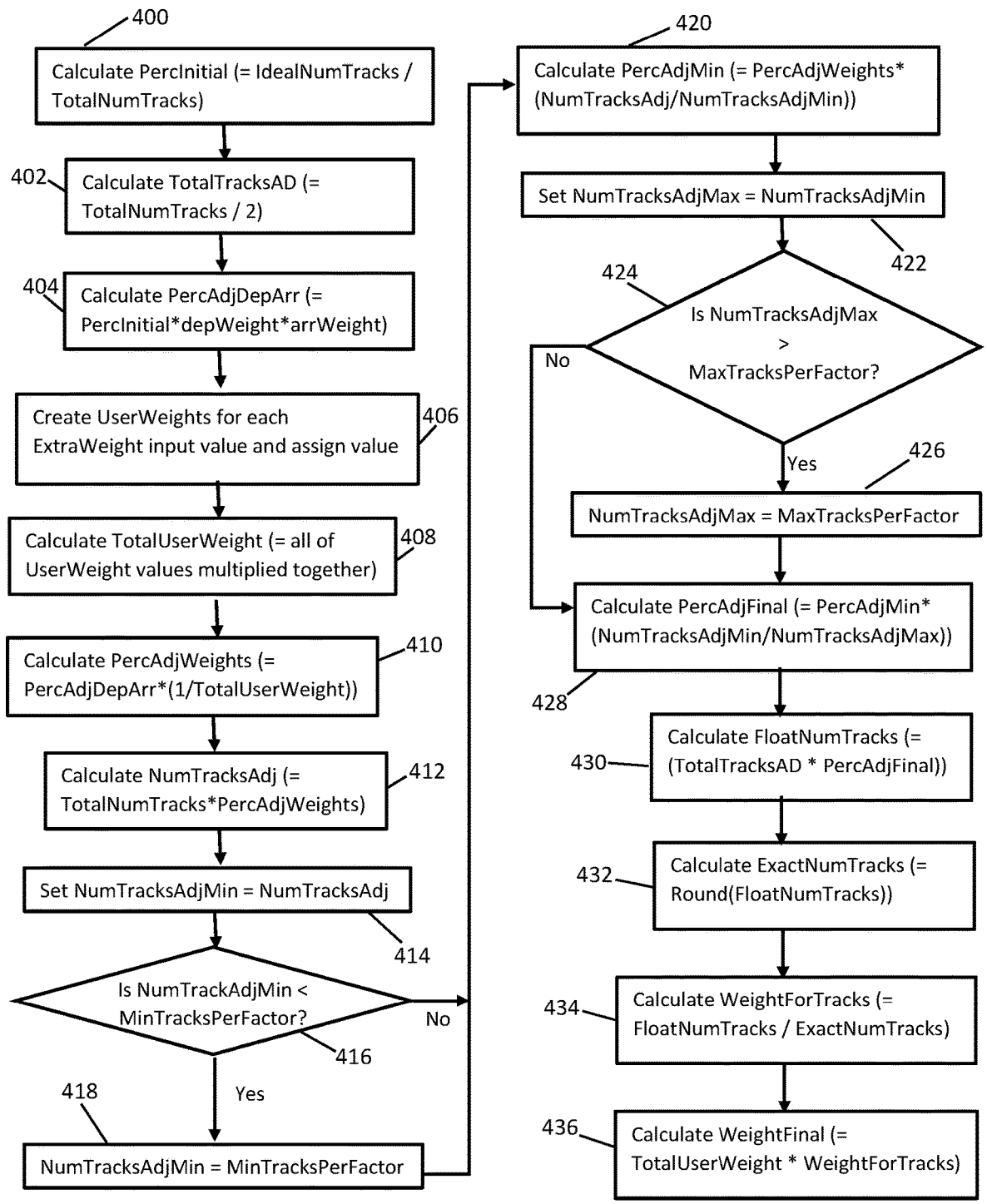
FIG. 4 shows a flow chart of an algorithm used in the method steps listed in FIG. 3.

With reference back to Step 312 and FIG. 4, a first sub step 400 of step 312 is calculating an initial value for percentage of tracks to query ("PercInitial") defined below in Equation 2. This is done by dividing the ideal number of tracks ("IdealNumTracks") calculated in step 310 using Equation 1.

$$PercInitial=IdealNumTracks/TotalNumTracks \quad \text{Equation 2}$$

Next, substep 402 includes calculating the total number of tracks of arrivals and departures ("TotalTracksAD") defined below in Equation 3.

$$TotalTracksAD=TotalNumTracks/2 \quad \text{Equation 3}$$

Substep 404 includes calculating an adjusted value for the percentage of arrivals and departures ("PercAdjDepArr") calculated using Equation 4 below. "depWeight" and "arrWeight" were given in Step 306.

$$PercAdjDepArr=PercInitial*depWeight*arrWeight \quad \text{Equation 4}$$

Sub step 406 includes creating UserWeights for each ExtraWeight input value and assigning values to the UserWeights. The ExtraWeight input was created/input in Step 304. The value of each UserWeight should be equal to "1" if there is no match with that variable or the given weight value if there is a match. For example, if a user added an ExtraWeight of "2" when DEN="E", then if the applicable unique factor has a DEN value of "E" the UserWeight would be set to "2". If not, the UserWeight would be set to "1". There should be one UserWeight created for each ExtraWeight that the user entered in Step 304. For example, if there is a ExtraWeight1 and an ExtraWeight2, there should also be a UserWeight1 and UserWeight2.

Substep 408 includes calculating the Total User Weight ("TotalUserWeight") for the unique factor wherein Total User Weight equals all of the UserWeight values multiplied together. In an example in which there is a UserWeight1 of 1.3 and a UserWeight2 of 2, the Total User Weight would be 2.6.

Substep 410 includes calculating the percentage of adjusted weights ("PercAdjWeights") based on the adjusted percentage of arrivals and departures and the Total User Weight using Equation 5 below.

$$PercAdjWeights=PercAdjDepArr*(1/TotalUser\text{-}Weight) \quad \text{Equation 5}$$

Substep 412 includes calculating an adjusted number of tracks ("NumTracksAdj") which equals the total number of tracks ("TotalNumTracks") multiplied by percentage of adjusted weights ("PercAdjWeights").

At this point, in substep 414, the adjusted minimum number of tracks ("NumTracksAdjMin") is set equal to the adjusted number of tracks ("NumTracksAdj") calculated in substep 412. At substep 416, a determination is made as to whether the adjusted minimum number of tracks ("NumTracksAdjMin") is less than the minimum number of tracks per factor ("MinTracksPerFactor"). If so, in substep 418, the adjusted minimum number of tracks ("NumTracksAdjMin") is set equal to the minimum number of tracks per factor ("MinTracksPerFactor").

Next, at substep 420, the adjusted percentage of minimum tracks ("PercAdjMin") is calculated according to Equation 6. The purpose of this equation is to take the current "percentage of tracks to use" value for this unique factor and adjust it based on a possible change in number of tracks due to not reaching a minimum. PercAdjMin is fed into the calculation for PercAdjFinal in a later substep described below shown in Equation 7.

$$PercAdjMin=PercAdjWeights*(NumTracksAdj/NumTracksAdjMin) \quad \text{Equation 6}$$

At substep 422 the adjusted maximum number of tracks ("NumTracksAdjMax") is set equal to the adjusted minimum number of tracks ("NumTracksAdjMin"). In substep 424, a determination is made as to whether the adjusted maximum number of tracks ("NumTracksAdjMax") is greater than maximum number of tracks per factor. If so, in substep 426, the adjusted maximum number of tracks ("NumTracksAdjMax") is set equal to the maximum number of tracks per factor ("MaxTracksPerFactor").

At this point, in substep 428, a final adjusted percentage of tracks ("PercAdjFinal") is calculated using Equation 7 below. The purpose of this equation is to take the current "percentage of tracks to use" value for this unique factor and adjust it based on a possible change in the number of tracks due to having too many tracks (i.e., greater than the maximum per factor). PercAdjFinal is later fed into the calculation at the next step for FloatNumTracks.

$$PercAdjFinal=PercAdjMin*(NumTracksAdjMin/NumTracksAdjMax) \quad \text{Equation 7}$$

In substep 430, "FloatNumTracks" is calculated by multiplying the total tracks of arrivals and departures ("TotalTracksAD") by the adjusted final percentage of tracks ("PercAdjFinal"). FloatNumTracks is the number of tracks to be queried for this unique factor, taking into account all the prior reductions and minimum/maximum restrictions. For example, there may be 500 tracks for this unique factor (e.g., for this runway/INM_Type/DEN combination), but FloatNumTracks might be approximately 1/10th of that, or, for example, 50.6, after all calculations are completed.

In substep 432, the exact number of tracks ("ExactNumTracks") is calculated by rounding up the FloatNumTracks to the next whole number. This is done because FloatNumTracks may not be a whole number, based on all the calculations. But there are always a whole number of tracks in the database. So, for example, if FloatNumTracks is 50.6, ExactNumTracks would be 51.

Next, in substep 434, weight value for the tracks ("WeightForTracks") is calculated according to Equation 8 below. Since the exact number of tracks is a rounded value of the calculated ideal number of tracks, we have to calculate what weighting adjustment is necessary to account for the percentage difference between the two.

$$WeightForTracks=FloatNumTracks/ExactNumTracks \quad \text{Equation 7}$$

Finally, in substep 436, the final weight value for the tracks ("WeightFinal") is calculated as the total user weight ("TotalUserWeight") from substep 408 multiplied by the weight value for the tracks ("WeightForTracks"). Thus, at this point, there is an exact number of tracks ("ExactNumTracks") that has been calculated as well as a final weight value ("WeightFinal") to be attributed to the tracks. These two values are then used in subsequent step 314 as discussed above.

The previously described embodiments of the present disclosure have many advantages, including substantially reducing the amount of time it takes the AEDT to calculate noise contours for an airport using flight track data from that airport, such flight track data taken over an extended period of time (most often, a year). The method generates an AEDT input file with significantly less flight tracks, but some or all of those flight tracks are weighted to varying degrees to ensure that, when using the generated input file, output from the AEDT would be substantially the same as if all flight tracks had been input to the AEDT. The system and method described herein also provides a way for a user to add extra emphases to one or more variables of flight track data in the generated input file for specific flight tracks, thus tailoring the generated input data to variables that are the most important to the particular user.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method of generating an input file in a computable readable format for use with the Aviation Environmental Design Tool (AEDT) to increase the efficiency of the AEDT, the method comprising the steps of:
   a. running a software program on a computer wherein the software program is stored on a computer readable medium in communication with the computer and wherein the software program includes an algorithm for performing specific steps;
   b. inputting user input data to the computer using a graphical user interface in communication with the computer, wherein the user input data comprises information in the form of values related to specific variables associated with flights at a specific airport;
   c. determining a plurality of unique factors using the computer based on the user input data, wherein each unique factor comprises a unique combination of variables from the user input data;
   d. accessing a database in communication with the computer wherein the database includes flight track data stored thereon, such flight track data including data related to flight tracks of aircraft arriving and departing at a specific airport for a specific period of time;
   e. querying the database using the computer to determine how many aircraft arrivals or departures meet each unique factor combination of variables for each unique factor;
   f. running the algorithm to perform the steps of:
      i. calculating an exact number of flight tracks to query the database for each unique factor; and
      ii. determining weight values to assign to the flight tracks for each unique factor;
   g. querying a random sample of flight tracks in the database for each unique factor based on the calculated exact number of flight tracks and the determined weight values; and
   h. generating an input file comprising all flight track data associated with the random sample of flight tracks queried by the computer.

2. The method of claim 1 further comprising an initial step of collecting flight track data and storing such flight track data in a database in communication with the computer.

3. The method of claim 1 wherein the step of inputting user input data further comprises inputting user input data in the form of weight values for specific variables wherein more weight is given to queried data that meets specific criteria.

4. The method of claim 1 wherein the step of accessing the database further comprises the step of detecting and adjusting anomalies in the flight track data.

5. The method of claim 1 further comprising the step of determining an ideal number of flight tracks based on the user input data including a variable of average daily flight operations multiplied by a variable of number of days for such flight operations.

6. The method of claim 1 further comprising the steps of:
   a. querying the database to determine the total number of aircraft departures and arrivals by aircraft type for a specified time period; and
   b. creating a departure weight value based on the total number of aircraft departures and arrivals equaling total number of arrivals divided by the total number of departures during the specific time period;
   c. creating an arrival weight value based on the total number of aircraft departures and arrivals equaling total number of departures divided by the total number of arrivals during the specific time period; and
   d. adjusting a percentage of aircraft arrivals versus departures using the algorithm by factoring in the departure weight and the arrival weight.

7. The method of claim 5 further comprising selecting flight tracks based on the user input data including a variable of average daily flight operations multiplied by a variable of number of days for such flight operations.

8. A method of generating an input file in a computable readable format for use with the Aviation Environmental Design Tool (AEDT) to increase the efficiency of the AEDT, the method comprising the steps of:
   a. receiving user input data on a computer, the user input data including values related to specific variables associated with flights at a specific airport;
   b. determining a plurality of unique factors using the computer based on the user input data, wherein each unique factor comprises a unique combination of variables from the user input data;
   c. accessing a database in communication with the computer wherein the database includes flight track data stored thereon, such flight track data including data related to flight tracks of aircraft arriving and departing at a specific airport for a specific period of time;
   d. querying the database using the computer to determine how many aircraft arrivals or departures meet each unique factor combination of variables for each unique factor;
   e. calculating an exact number of flight tracks to query the database for each unique factor;

f. determining weight values to assign to the flight tracks for each unique factor; and g. querying a random sample of flight tracks in the database for each unique factor based on the calculated exact number of flight tracks and the determined weight values;

h. generating a file comprising all flight track data associated with the random sample of flight tracks queried by the computer.

9. A method of processing an input file in a computable readable format for use with the Aviation Environmental Design Tool (AEDT), the method comprising the steps of:

a. running AEDT software on a first computer;

b. processing an input file using the first computer running the AEDT software wherein the input file is in a computable readable format which is compatible with the AEDT software and wherein the input file was created using the steps of:

i. determining a plurality of unique factors using a second computer based on user input data, wherein each unique factor comprises a unique combination of variables from the user input data;

ii. accessing a database in communication with the second computer wherein the database includes flight track data stored thereon, such flight track data including data related to flight tracks of aircraft arriving and departing at a specific airport for a specific period of time;

iii. querying the database using the second computer to determine how many aircraft arrivals or departures meet each unique factor combination of variables for each unique factor;

iv. calculating an exact number of flight tracks to query the database for each unique factor; and v. determining weight values to assign to the flight tracks for each unique factor.

10. The method of claim 9 wherein the first computer comprises the second computer.

11. The method of claim 9 further comprising the step of producing a noise contour file based on the processed input file wherein the noise contour file includes noise contour data that is substantially the same as noise contour data that would have been produced using the AEDT software if all flight tracks from the database had been included in the input file.

* * * * *